(12) United States Patent
Wallman et al.

(10) Patent No.: US 10,047,772 B2
(45) Date of Patent: Aug. 14, 2018

(54) SINGLE ACTING HYDRAULIC CYLINDER

(71) Applicant: Wallmek i Kungälv AB, Kungälv (SE)

(72) Inventors: Niklas Wallman, Kungälv (SE); Kim Lindblad, Kungälv (SE)

(73) Assignee: WALLMEK I KUNGALV AB, Kungalv (SE)

( * ) Notice: Subject to any disclaimer, the term of this patent is extended or adjusted under 35 U.S.C. 154(b) by 198 days.

(21) Appl. No.: 15/290,852

(22) Filed: Oct. 11, 2016

(65) Prior Publication Data

US 2017/0102013 A1 Apr. 13, 2017

(30) Foreign Application Priority Data

Oct. 12, 2015 (EP) ..................................... 15189415

(51) Int. Cl.
*F15B 15/14* (2006.01)
*F16J 1/12* (2006.01)
(Continued)

(52) U.S. Cl.
CPC ........ *F15B 15/1447* (2013.01); *B25B 27/026* (2013.01); *B25B 27/064* (2013.01); *F15B 15/1457* (2013.01); *F16J 1/12* (2013.01)

(58) Field of Classification Search
CPC . B25B 27/026; B25B 27/064; F15B 15/1457; F15B 15/1447; F16J 1/12
See application file for complete search history.

(56) References Cited

U.S. PATENT DOCUMENTS 3,507,028 A 4/1970 Stellatella
4,213,239 A 7/1980 Filer
(Continued)

FOREIGN PATENT DOCUMENTS

DE 20 2005 003450 U1 5/2005
DE 10 2012 006617 A1 3/2013
JP 2004-084725 A 3/2004

OTHER PUBLICATIONS

European Search Report dated Apr. 4, 2016 for European Application No. 15189415.1.
(Continued)

*Primary Examiner* — Thomas E Lazo
(74) *Attorney, Agent, or Firm* — Buchanan Ingersoll & Rooney P.C.

(57) ABSTRACT

A single acting hydraulic cylinder comprises a cylinder housing and a piston rod arranged within the cylinder housing, where the piston rod can be actuated in response to a hydraulic pressure acting on said piston rod. The piston rod comprises an axially extending through hole and a pulling portion having an internally threaded section partly extending into the axially extending through hole in order to engage a threaded portion of a pulling rod. When in the pulling mode the single acting hydraulic cylinder further comprises the pulling rod having the threaded portion, and when in the pressing mode the single acting hydraulic cylinder further comprises a pressing rod having a threaded portion. Also, when in the pressing mode, the piston rod further comprises a pressing portion having an internally threaded section partly extending into the axially extending through hole, in order to engage the threaded portion of the pressing rod.

10 Claims, 5 Drawing Sheets

(51) Int. Cl.
*B25B 27/02* (2006.01)
*B25B 27/06* (2006.01)

(56) References Cited

U.S. PATENT DOCUMENTS

| | | | | |
|---|---|---|---|---|
| 5,404,631 A | * | 4/1995 | Boyd | B25B 27/064 29/252 |
| 6,389,668 B1 | * | 5/2002 | Hwang | B25B 27/062 29/263 |
| 2006/0196029 A1 | * | 9/2006 | Klann | B25B 27/023 29/260 |

OTHER PUBLICATIONS

Office Action (Communication pursuant to Rule 114(2) EPC) dated Sep. 14, 2017, by the European Patent Office in corresponding European Patent Application No. 15189415.1-1701 (4 pages).

* cited by examiner

SINGLE ACTING HYDRAULIC CYLINDER

TECHNICAL FIELD OF THE INVENTION

The present invention relates to a hydraulic cylinder, more specifically to a single acting hydraulic cylinder.

BACKGROUND

Hydraulic cylinders in the automotive repair and maintenance industry have been used for decades. Their ability to deliver large amounts of pressing or pulling force while still being fairly portable makes them one of the most used devices in a vehicle repair shop. They are often used together with various extracting and mounting tools, especially with components that are fitted in slots using large pressing forces, e.g. wheel bearings, wheel hubs, axle shafts, etc.

Even though most of the tools used in repair shops have evolved quite a bit in terms of size, weight and simplicity, hydraulic cylinders still to this day are pretty much the same hydraulic cylinders that were used decades ago, aside for some smaller improvements. And due to the fact that there are relatively large forces involved, there have been few attempts to provide a small and light hydraulic cylinder without using unreasonably expensive and scarce materials. However, with the ever present need to reduce size and optimize the space usage in every aspect of the automotive industry there is a rapidly growing need for a similar evolution in the automotive repair industry as well, in particular for hydraulic cylinders.

Single acting hydraulic cylinders are often preferable over double acting hydraulic cylinders in terms of simplicity and cost. Their general configuration allows them to be used for pulling action at one end, and pressing action at the other end. However, as mentioned the demand for size reduction and/or space optimization in all aspects of the automotive industry has lately become rather problematic. Particularly when using the hydraulic cylinder in a so called pressing mode the operator (mechanic) often has to work in extremely confined spaces which can cause a lot of problems when it comes to adjusting the position of for example the press axle or pressing rod.

To this end some attempts have been made to solve some of the abovementioned issues, like for example providing a hydraulic cylinder with a hollow piston rod and a press axle/pressing rod that extends over the entire axial length of the hydraulic cylinder, such as cylinder is e.g. described in US 2006/0196029. However, this solution is limited in many ways, and greatly increases the risk of bending the pressing rod inside the cylinder housing which often results in both costly and complicated repairs of the actual hydraulic cylinder.

There is therefore a need for an improved hydraulic cylinder for use in auto repair shops, which is compact, light and easy to operate.

SUMMARY

It is therefore an object of the present invention to provide a single acting hydraulic cylinder assembly for pressing and pulling action, which alleviates all or at least some of the above-discussed drawbacks of presently known single acting hydraulic cylinders.

This object is achieved by means of a single acting hydraulic cylinder as defined in the appended claims.

According to a first aspect of the present invention, there is provided a single acting hydraulic cylinder having a pulling mode and a pressing mode, said single acting hydraulic cylinder comprising:
  a cylinder housing; and
  a piston rod arranged within the cylinder housing such that the piston rod can be actuated in response to a hydraulic pressure acting on said piston rod and wherein said piston rod comprises an axially extending through hole, wherein said piston rod further comprises a pulling portion having an internally threaded section partly extending into the axially extending through hole, in order to engage a threaded portion of a pulling rod,
  wherein the single acting hydraulic cylinder, in the pulling mode, further comprises the pulling rod having the threaded portion, and
  wherein the single acting hydraulic cylinder, in the pressing mode, further comprises a pressing rod having a threaded portion and wherein the piston rod comprises a pressing portion having an internally threaded section partly extending into the axially extending through hole, in order to engage the threaded portion of the pressing rod.

The single acting hydraulic cylinder (may simply be referred to as hydraulic cylinder in the following) has, due to its general configuration, as mentioned two modes, i.e. a pulling mode and a pressing mode. In the pulling mode, the hydraulic cylinder may comprise the cylinder housing, the pulling portion of the piston rod, and the pulling rod. In the pressing mode, the hydraulic cylinder may comprise the cylinder housing, both the pulling portion and the pressing portion of the piston rod, and the pressing rod (instead of the pulling rod).

The hydraulic cylinder can be described as having two ends, where one end is used for a pulling action and the other end is used for a pressing action. This concept and configuration is readily understood by the skilled artisan and need not be further discussed in any greater detail in this application. The internally threaded sections are to engage a corresponding outer thread on a pulling or pressing rod and the threaded sections should be understood as axially limited sections of the pulling and the pressing portion having an internally threaded part. In other words, the internal (screw) thread which is to engage an outer thread of a pulling rod or pressing rod only partially extends along the longitudinal axis of each portion. This will be further clarified in the detailed description in reference to the appended figures.

The present invention is based on the realization that by providing an internally threaded section that only partly extends into the axially (longitudinal axis) extending through hole of the piston rod at each end of the piston rod, i.e. at each of the two portions, one can prevent placement of a pulling or pressing axle arranged inside the through hole of the piston rod that extends across the full length (along the longitudinal axis) of the hydraulic cylinder/piston rod. This is due to the fact that a pressing rod or pulling rod (sometimes called carriage beam) can only extend through a relatively short section of the full length of the piston rod. The lack of continuous internal threading throughout the entire length of the piston rod prevents the pressing rod or pulling rod from being arranged any deeper inside the through hole than the axial length of the internally threaded section, i.e. limiting the depth of screwing in, and thereby mitigating the risk of bending a pulling rod or pressing rod inside the hydraulic cylinder since it cannot effectively be arranged inside of the full length of the piston rod. The limiting of the depth the pulling rod or pressing rod may be screwed (screwing depth of the pulling rod or pressing rod) into the pulling portion or pressing portion may be done by (as mentioned) providing an axially limited internally threaded section within the pulling portion, it may also be done by providing a stop collar adjacent to the threaded section or narrowing the inner diameter of the through hole after a certain depth, etc. Therefore, in one exemplary embodiment the piston rod further comprises means for limiting the depth of the pulling rod or pressing rod when screwed into the pulling portion or pressing portion respectively.

The screwing depth limitation is particularly relevant for the pulling rod/axle, which is generally long in relation to the pressing rod, hence, more prone to bending due to forces not being in line with its long axis. Thus, in one exemplary embodiment only the pulling portion of the piston rod is arranged with means for limiting the depth of the pulling rod when screwed into the pulling portion.

With the solution provided by the present invention, the pulling rod, when it is arranged within the through hole of the piston rod, is far more likely to bend at a portion of the pulling rod that is located outside the piston rod if the pulling rod were to be subjected to a force that is not in line with its longitudinal axis. This means that the bent rod can still easily be unscrewed from the pulling portion of the piston rod, since the portion of the pulling rod within the pulling portion will still be substantially straight. This drastically decreases the complexity and cost of the repair, since the complete hydraulic cylinder does not need to be opened in order to remove the bent part. Moreover, in some cases, a repair is not even a feasible option but instead the whole hydraulic cylinder must be replaced. Thus, the solution provided by the invention can cut a lot of costs associated with bent pulling rods or pressing rods for the operators. Another advantage of having the threaded section(s) only partly extending into the axially extending through hole of the piston rod is that a shorter thread has larger/wider tolerance range than a longer thread, which makes the shorter thread more versatile and less selective of the quality of the threads on the pulling rod or the pressing rod. In other words, a pulling or pressing rod having worn out threads may still be used, hence lowering the need of replacing the pulling or pressing rod.

According to one exemplary embodiment the pressing portion is removable from the pulling portion of the piston rod. The pressing portion can be removed from the pulling portion of the piston rod in a pulling mode. This reduces the weight and maneuverability of the hydraulic cylinder when it is used in a pulling mode, thus facilitating the work of an operator. Moreover it allows for easy replacement of the pulling portion of the piston rod if it needed to be replaced, e.g. if a pulling rod would be stuck inside due to bending. Thus, one is not required to replace the whole piston rod since the pulling rod cannot extend across both portions when arranged inside of the piston rod.

According to another exemplary embodiment the pressing rod comprises two ends, wherein the end of said two ends which is arranged inside said through hole, when said single acting hydraulic cylinder is being used in the pressing mode, comprises a tool engaging portion, thereby enabling adjustment of said pressing rod in relation to said piston rod. It is to be understood that this embodiment enables adjustment of the pressing rod in a simpler manner than what is known in the art. Conventionally an operator had to reach forward to the front of the hydraulic cylinder (pressing end of the hydraulic cylinder) in order to adjust the position of the pressing rod by rotating the pulling rod around its longitudinal axis (i.e. screwing action). This may be extremely difficult in situations where there is a limited amount of space around the front of the hydraulic cylinder when it is used in a pressing mode. Accordingly, the piston rod comprises a through hole (according to the first aspect), which firstly reduces the overall weight, and secondly provides a possibility of adjusting the pressing rod's position by inserting an adjustment tool which engages a tool engaging portion provided at the end portion of the pressing rod which is arranged within the piston rod. Therefore, an operator has the possibility to adjust the position of the pressing rod from the back of the hydraulic cylinder when the hydraulic cylinder is used in a pressing mode.

The axial length of the single acting hydraulic cylinder is according one exemplary embodiment between 120 mm and 180 mm, such as e.g. between 140 mm and 160 mm, or roughly around 150 mm. This makes the hydraulic cylinder ideal for operation in confined spaces such as certain type of work around automobiles, transporters, trucks or trailers. The axial length is to be understood as the length along a longitudinal axis.

In accordance with another exemplary embodiment of the invention, the stroke length of the single acting hydraulic cylinder is between 40 mm and 60 mm, such as e.g. 45 mm and 55 mm, or roughly 50 mm. In a pulling mode, if there is an extremely limited amount of space, and the pressing portion of the piston rod has been removed, the pulling portion can be withdrawn into the cylinder housing for a portion of its entire stroke length in order to further reduce the entire axial length of the hydraulic cylinder by the same amount. This further reduces the size of the hydraulic cylinder in order to allow for maneuverability in really confined spaces.

According to another aspect of the present invention, there is provided a method for adjusting the position of a pressing rod in a single acting hydraulic cylinder, where the method comprises the steps of:

providing a single acting hydraulic cylinder which comprises:
  a cylinder housing;
  a piston rod arranged within the cylinder housing such that the piston rod can be actuated in response to a hydraulic pressure acting on said piston rod and wherein said piston rod comprises an axially extending through hole, and wherein the piston rod further comprises a pressing portion having an internally threaded section partly extending into the axially extending through hole; and
  a pressing rod having a threaded portion which matches the internally threaded section of the pressing portion, said pressing rod being arranged within the pressing portion and wherein said pressing rod comprises two ends, wherein one of said two ends is arranged inside said axially extending through hole and comprises a first tool engaging portion;

providing an adjustment tool having a second tool engaging portion;

adjusting the position of the pressing rod relative to the pressing portion of said piston rod by engaging, via said axially extending through hole, said first tool engaging portion with said second tool engaging portion and rotating said adjustment tool around a longitudinal axis of the pressing rod.

The method for adjustment of the pressing rod is done in the so called pressing mode of the single acting hydraulic cylinder. With this aspect of the invention, similar advantages and preferred features are present as in the previously discussed first aspect of the invention.

According to another aspect of the present invention, there is provided a single acting hydraulic cylinder system having a pulling mode and a pressing mode, said single acting hydraulic cylinder system comprising:
a cylinder housing;
a piston rod arranged within the cylinder housing such that the piston rod can be actuated in response to a hydraulic pressure acting on said piston rod and wherein said piston rod comprises an axially extending through hole;
a pulling rod having a threaded portion;
a pressing rod having a threaded portion;
wherein said piston rod further comprises a pulling portion having an internally threaded section partly extending into the axially extending through hole, in order to engage the threaded portion of the pulling rod; and
wherein the piston rod comprises a pressing portion having an internally threaded section partly extending into the axially extending through hole, in order to engage the threaded portion of the pressing rod. With this aspect of the invention, similar advantages and preferred features are present as in the previously discussed aspects of the invention.

These and other features and advantages of the present invention will in the following be further clarified with reference to the embodiments described hereinafter.

BRIEF DESCRIPTION OF THE DRAWINGS

For exemplifying purposes, the invention will be described in close detail in the following with reference to embodiments thereof illustrated in the attached drawings, wherein.

All of the figures are schematic, not necessarily to scale, and they only show parts which are necessary in order to elucidate the invention, other parts being omitted or merely suggested.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances well known constructions or functions are not described in detail, so as not to obscure the present invention.

Figure 1:
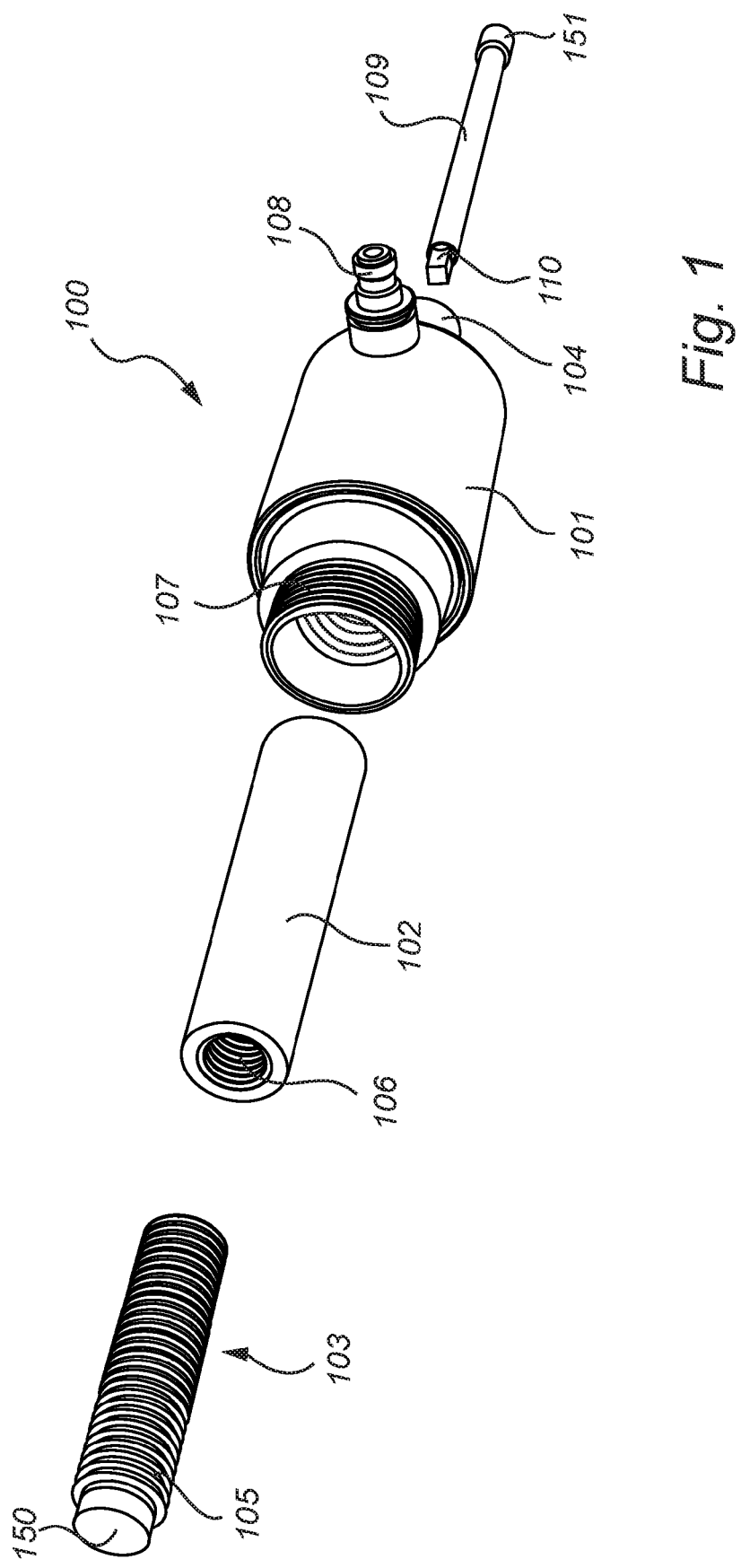
FIG. 1 is an exploded perspective view of a single acting hydraulic cylinder in accordance with an embodiment of the present invention, in a pressing mode.

FIG. 1 illustrates a hydraulic cylinder 100 in an exploded perspective view in accordance with one embodiment of the invention. More specifically, FIG. 1 illustrates a single acting hydraulic cylinder 100 arranged in a pressing mode.

The hydraulic cylinder 100 comprises a cylinder housing 101, which in turn comprises a fluid port 108 into which hydraulic fluid is pumped. The hydraulic fluid can be any commonly used hydraulic fluid, such as e.g. mineral oil, water, phosphate ester, water-based ethylene glycol compounds, silicon fluid, etc. More details regarding the operational terms and functionality of the hydraulic cylinder will be provided with reference to FIGS. 2a, 2b and 3, i.e. the cross-sectional views, as it can provide a clearer understanding.

The cylinder housing 101 further comprises an outer thread 107 arranged at the pressing end of the cylinder housing 101. This outer thread 107 may be used in order to secure a counter hold (not shown) when the hydraulic cylinder is to be used for pressing action. Further, a pressing portion 102 of a piston rod is illustrated. The pulling portion 104 of the piston rod is slightly shown in this figure as well. In this particular exemplary embodiment the pressing portion 102 is a separate and removable portion 102 of the piston rod. The pressing portion 102 of the piston rod may however, according to one exemplary embodiment, be an integral part of the piston rod (shown in FIG. 2b, where the pressing portion has reference number 202). The pressing portion 102 comprises an internally threaded section 106, it cannot be seen from this perspective but the internal (screw) threads 106 do not extend along the entire axial length of the pressing portion 102. Hence, the pressing portion 102 also has a non-threaded internal section, or at least an internal section into which the pressing rod 103 cannot be positioned/placed. A pressing rod 103 (sometimes also called pressing axle or press axle) is to be screwed into the pressing portion 102. The pressing rod 103 has outer (screw) threads 105 which are to engage the internal threads 106 of the pressing portion 102, when the hydraulic cylinder 100 is to be used in a pressing mode.

Furthermore, an adjustment tool 109 (sometimes called extension rod 109) can be inserted through the piston rod 104, 102 of the hydraulic cylinder 100 from the opposite side of the pressing end, as indicated in FIG. 1. The adjustment tool 109 has an end portion 110 which is to engage a matching socket or recess (214 in FIG. 2a or FIG. 2b) in order to adjust the position of the pressing rod 103 in relation to the pressing portion 102, by a rotating action. This can be necessary when the hydraulic cylinder 100 is used in a pressing mode and in a very confined space. In such situations it might be extremely difficult to reach the pressing rod 103 with a hand in order to directly rotate/adjust the pressing rod 103. The adjustment tool 109 may then be inserted through the through hole of the piston rod from the back (if the pressing rod is to be considered to be in the front in the pressing mode) which facilitates the positional adjustment. The adjustment operation by means of an adjustment tool 109 is further clarified in the discussion in reference to FIG. 2. The end portion 110 of the adjustment tool 109 is in this particular illustration a male square connection fitting, however, as is readily understood by the skilled artisan this is merely an example of many possible connection fittings, such as e.g. rectangular, star, oval, polygonal, etc. The size of the square connection fitting may be chosen to be a quarter of an inch or ⅜ of an inch. It goes without saying that the hydraulic cylinder 100 is mainly made out of steel or some other appropriate metal alloy or metal as known in the art.

Figure 2A:
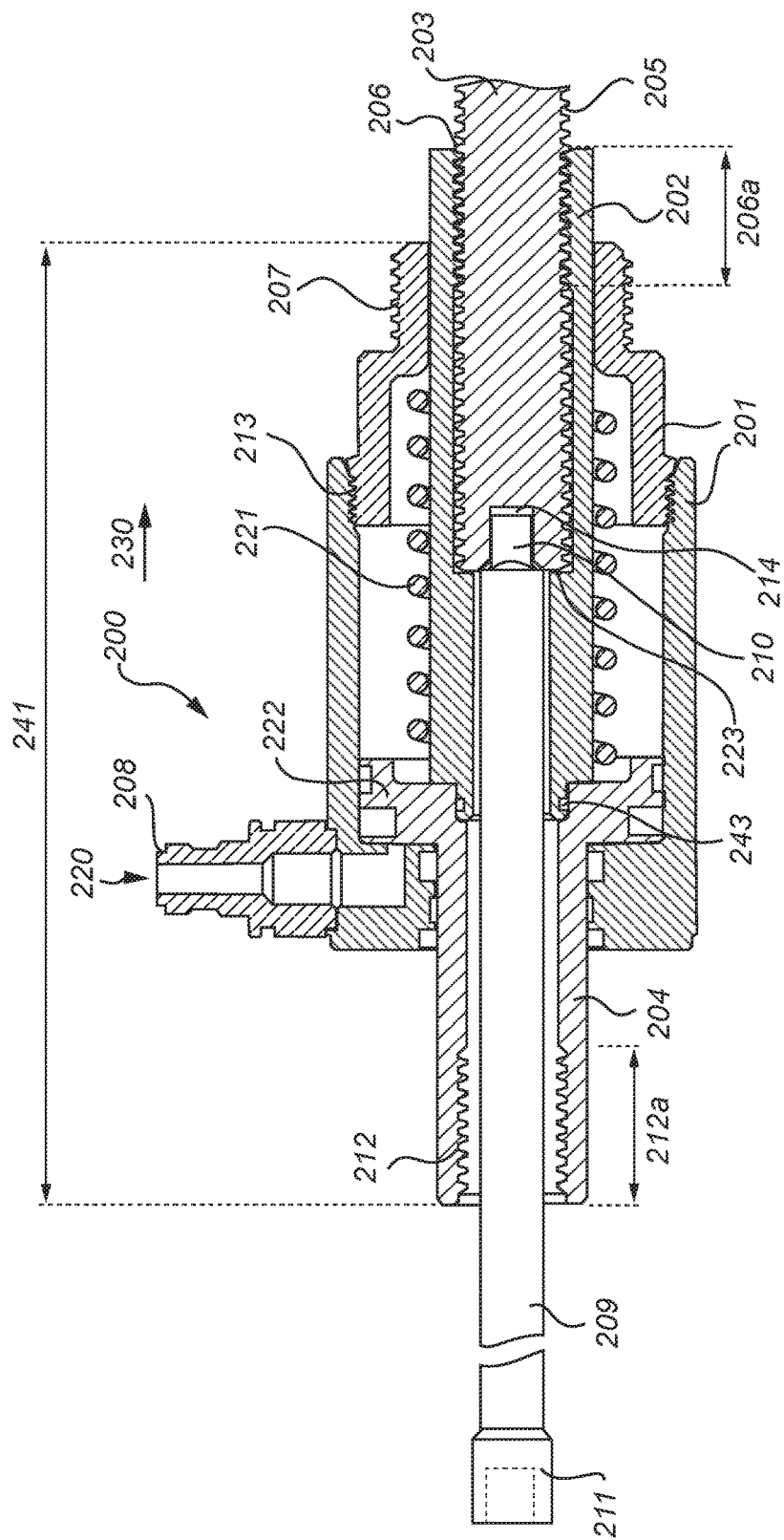
FIG. 2a is a cross sectional view along a longitudinal axis of the single acting hydraulic cylinder illustrated in FIG. 1.
Figure 2B:
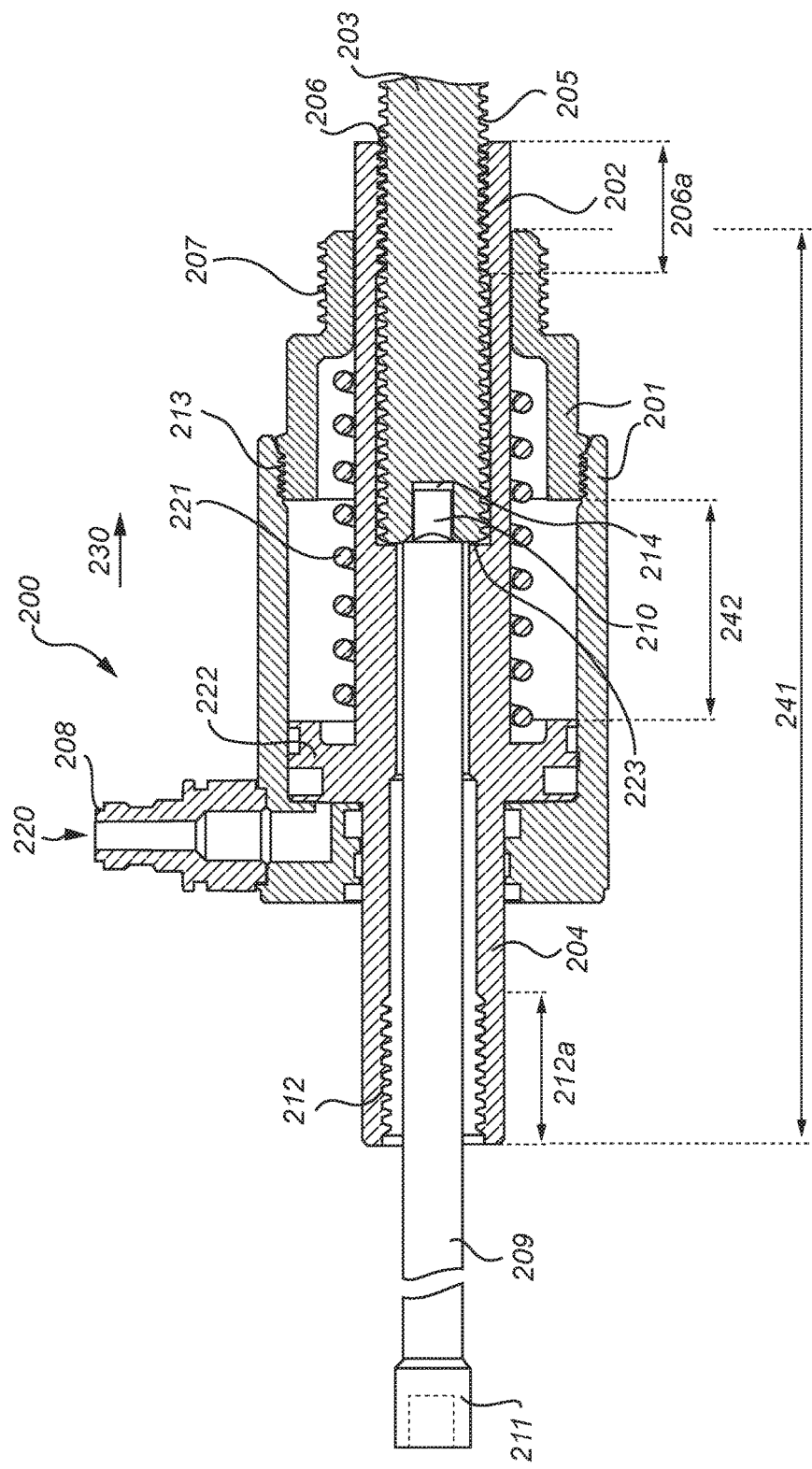
FIG. 2b is a cross sectional view along a longitudinal axis of a single acting hydraulic cylinder, in a pressing mode, in accordance with another embodiment of the present invention.

The following passages are made in reference to FIG. 2a and FIG. 2b since most functions and parts of the hydraulic cylinder 200 are generally the same. The difference between the two exemplary embodiments of FIG. 2a and FIG. 2b is that the piston rod 202, 204 in FIG. 2a comprises two separable portions, while in FIG. 2b the piston rod 202, 204 is made of one single piece. Therefore, in the following the reference numeral for the piston rod will mainly be the reference numerals of the pulling portion and the pressing portion of the piston rod, e.g. 202, 204 in FIGS. 2a and 2b. This is not however to be interpreted as that the piston rod must comprise two separable parts, as it is clearly an optional feature. Thus, the following the text will be in referral to either one of the figures since it is, almost entirely, equally applicable to both embodiments. In the exemplary embodiment illustrated in FIG. 2a, the two separable portions of the piston rod 202, 204 may be removably attached to each other, when in the pressing mode, by means of an O-ring 243 or some other equivalent attaching means.

FIGS. 2a and 2b illustrate cross sectional views of a single acting hydraulic cylinder 200 according to two exemplary embodiments of the invention. More particularly the hydraulic cylinders 200 in FIGS. 2a and 2b are in a pressing mode configuration. The figures are also used to further clarify the operational concept of a single acting hydraulic cylinder 200, as will be clear from the following discussion. The axial length of the hydraulic cylinder 200 is indicated by reference number 241, and the stroke length of the hydraulic cylinder 200 is indicated by reference number 242.

The hydraulic cylinder 200 has a cylinder housing 201. The cylinder housing 201 can be made out of a single piece of material, or it can be made out of two separately manufactured parts which are joined together as shown in FIGS. 2a and 2b. The two separate parts can be screwed together, as indicated by the matching screw threads 213. This may facilitate manufacturing and transport of the hydraulic cylinder 200 as well as maintenance of internal parts of the hydraulic cylinder 200.

Further, the cylinder housing 201 comprises an outer thread 207 and a hydraulic fluid port 208. The outer thread 207 on the cylinder housing 201 allows for fastening of a counter hold (not shown) which is desirable for some applications, e.g. pressing out axle shafts in vehicles or replacement of ball-joints by fastening a press block which engages the outer threading 207. The hydraulic fluid port 208 has an inlet 220 for the hydraulic fluid which is injected under some pressure in order to act on a piston section 222 of a piston rod 204, 202 arranged in the cylinder housing 201. The piston rod 204, 202 is then moved in a direction indicated by the arrow 230, i.e. towards the pressing end of the hydraulic cylinder 200. Since the hydraulic cylinder 200 is of a single acting type there is no fluid chamber on the other side of the piston section 222 or a second piston section on the piston rod 204, 202, instead the piston rod 204, 202 automatically returns to its starting position by means of a spring 221. The spring 221 is arranged within the cylinder housing 201 and configured so to press the piston rod 202, 204 back towards its starting position, i.e. towards the pulling end of the hydraulic cylinder 200. The returning of the piston rod 204, 202 may be done in other ways as well, e.g. using some other resilient structure, by gravity, manually pushing/pulling, magnetically, etc.

Furthermore, internally threaded sections 206a, 212a of the pressing portion 202 and the pulling portion 204 of the piston rod can be seen. As can further be observed the threads 206 of the internally threaded section 206a of the pressing portion 202 is in engagement with the outer threads 205 of a threaded portion of the pressing rod 203. Moreover the pressing rod 205 is prevented from being arranged any deeper into the piston rod 202, 204, due to a narrowing 223 of the internal diameter.

Even though the pressing rod 203, in this particular embodiment, can extend beyond the internal threaded section 206a into the pressing portion 202 of the piston rod 204, 202 it can still not extend along the entire length of the piston rod 204, 202. The reason why the pressing rod can be arranged deeper into the pressing portion 202 than the extension of the threaded section 206a is because the diameter of the section of the through hole between the means for limiting the depth 223 and the threaded section 206a is slightly larger than the diameter of the threaded section 206a. Here, some trade-offs exists between the pressing portion's 202 tolerances of the quality of the outer threads 205, providing a longer adjustment length, and the risk of a pressing rod 203 bending inside the piston rod 204, 202. However, even with this setup the pressing rod 203 is still far more likely to bend at a portion located outside the piston rod 204, 202. Moreover, by providing an axially limited threaded section 206a, (a bent) pressing rod 203 is easier to un-screw from the pressing portion 202 than it would be if the threaded section 206a would extend continuously through the pressing portion 202. The threaded sections 206a, 212a at the pressing portion 202 and pulling portion 204 respectively may each have an axial length of 20 mm to 40 mm, e.g. around 25 mm. The axial length is to be considered a length along the longitudinal axis of the piston rod 204, 202. The length 241 of the hydraulic cylinder may for example be between 120 mm and 180 mm, while the stroke length 242 may for example be between 40 mm and 60 mm.

FIG. 2a and FIG. 2b further illustrate the exemplary embodiment where the pressing rod 203 is provided with a tool engaging portion 214 at an end located within the through hole of the piston rod 204, 202 and facing the pulling end of the hydraulic cylinder 200. The tool engaging portion 214 is configured to engage the end portion 210 (i.e. a corresponding tool engaging portion 210) of an adjustment tool 209. In this particular exemplary embodiment the pressing rod 203 comprises a recess/socket 214 and the adjustment tool 209 comprises a protrusion 210, i.e. a female connecting element 214 and a male connecting element 210 respectively. This is however just one example of a number of possible configurations, the configuration regarding the connecting elements can for example be reversed, i.e. the pressing rod 203 may comprise a protrusion (i.e. male connecting element) instead. Further, the adjustment tool 209 may comprise a second tool engaging portion 211 at an opposite end of the first tool engaging portion 210, thereby providing means for cascading several adjustment tools or extension rods. In use, the embodiments illustrated in FIGS. 2a and 2b allow for an overall push or press operation where the position of the pressing rod 203 in relation to the piston rod 204, 202 may be adjusted by an adjustment tool 209.

Figure 3:
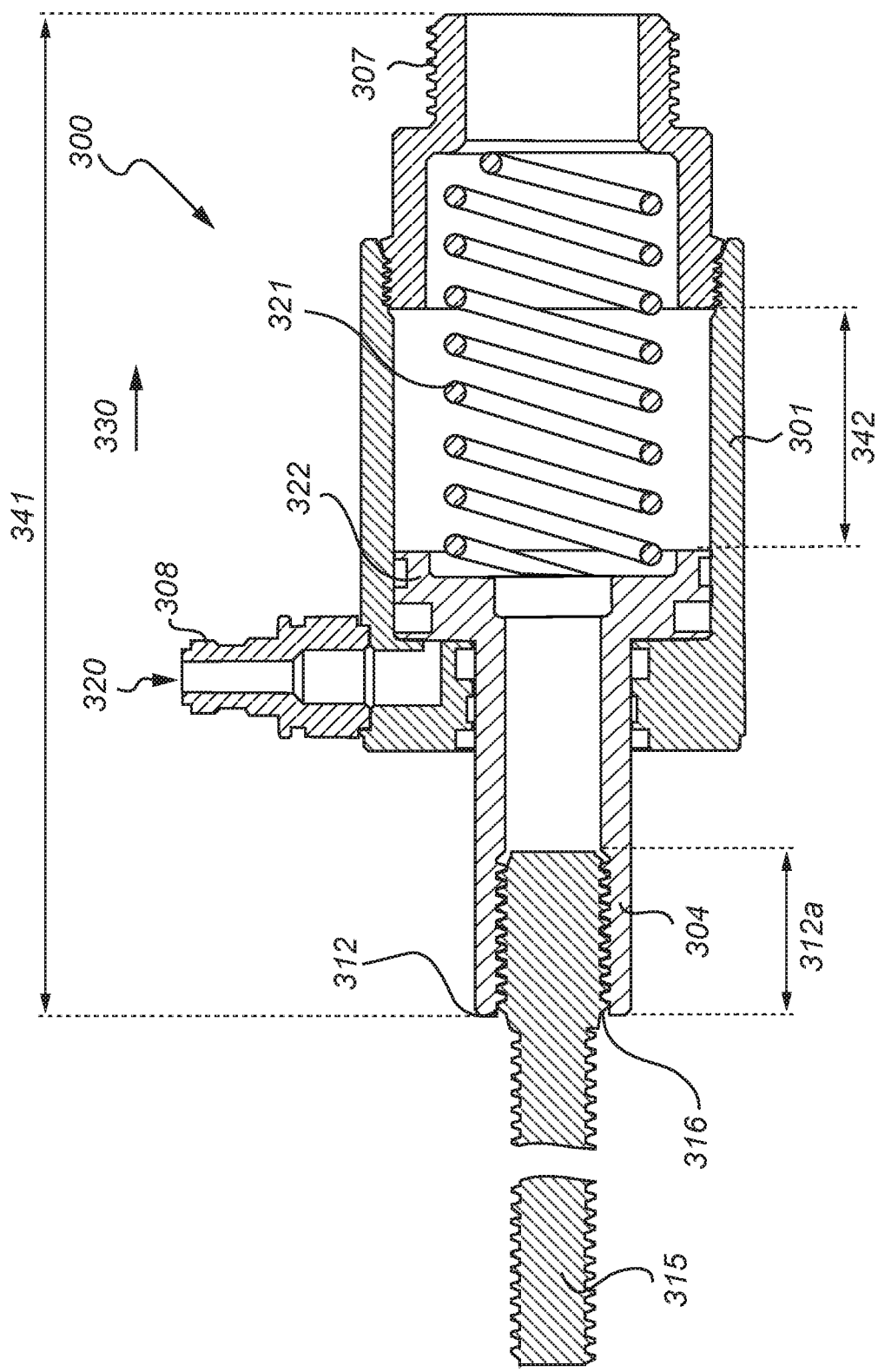
FIG. 3 is a cross sectional view along a longitudinal axis of the single acting hydraulic cylinder in accordance with an embodiment of the present invention in a pulling mode.

FIG. 3 is a cross sectional view of a single acting hydraulic cylinder 300 in a pulling mode, in accordance with an exemplary embodiment of the present invention. The hydraulic cylinder 300 follows the same operational principle as described with reference to FIGS. 2a and 2b, i.e. hydraulic fluid is injected 320 into the hydraulic fluid port/inlet 308, arranged on the cylinder body 301, in order to act on the piston section 322, and thereby on the piston rod 304, moving it in a direction indicated by the arrow 330. The piston rod 304 is then pushed back to the original position by means of a return spring 321 when the hydraulic pressure against the piston section 322 is reduced. In the pulling mode the pressing portion (202 in FIG. 2) of the piston rod may be removed. Thus, in the pulling mode, as can be seen in FIG. 3, the piston rod 304 can comprise only of the pulling portion 304 of the two portions (pulling and pressing). This decreases the overall weight of the hydraulic cylinder 300 when used in the pulling mode, making it easier for an operator to handle. However, in the following description in reference to FIG. 3, the pulling portion 304 will be referred to as the piston rod as there is no pressing portion present in this particular embodiment, the choice of wording should by no means be considered to be limiting for the protective scope of the invention.

The outer (screw) thread 307 on the cylinder housing 301, which may be used to attach a counter hold to the hydraulic cylinder 300 when it is being used in a pressing mode can be covered with a lid (not shown) which can be screwed on when the hydraulic cylinder 300 is being used in a pressing mode. The lid can then efficiently prevent contamination of the internal parts of the cylinder housing 301. The hydraulic cylinders axial length 341 may be chosen to be between 120 mm and 180 mm, such as e.g. 150 mm, and the stroke length 342 may be chosen to be between 40 mm and 60 mm.

Further, a pulling rod 315 is secured in the piston rod 304, more specifically a threaded portion 316 of the pulling rod is screwed into an internally threaded section 312a by engaging the internal threads 312 of the piston rod 304, thereby securing the pulling rod 315 to the piston rod 304. The internally threaded section 312a only partially extends into the through hole of the piston rod 304, viewed from the pulling end of the piston rod 304. The threaded section 312a may for example have an axial length of 20 mm to 40 mm, such as e.g. 25 mm. This prohibits the pulling rod 315 to be arranged deeper into the through hole of the piston rod 304, in order to mitigate the risk of the pulling rod 315 bending inside the through hole in case of an obliquely applied force in relation to the long axis of the hydraulic cylinder 300. This type of unfortunate event is a reoccurring problem in vehicle repair shops and often due to human error, i.e. an operator (mechanics) unintentionally failing to align the hydraulic cylinder 300 and the pulling rod 315 perfectly straight. It furthermore, facilitates extracting of bent pulling rods 315 and widens tolerance levels analogously to the threaded sections of the embodiment discussed with reference to FIGS. 2a and 2b.

Figure 4:
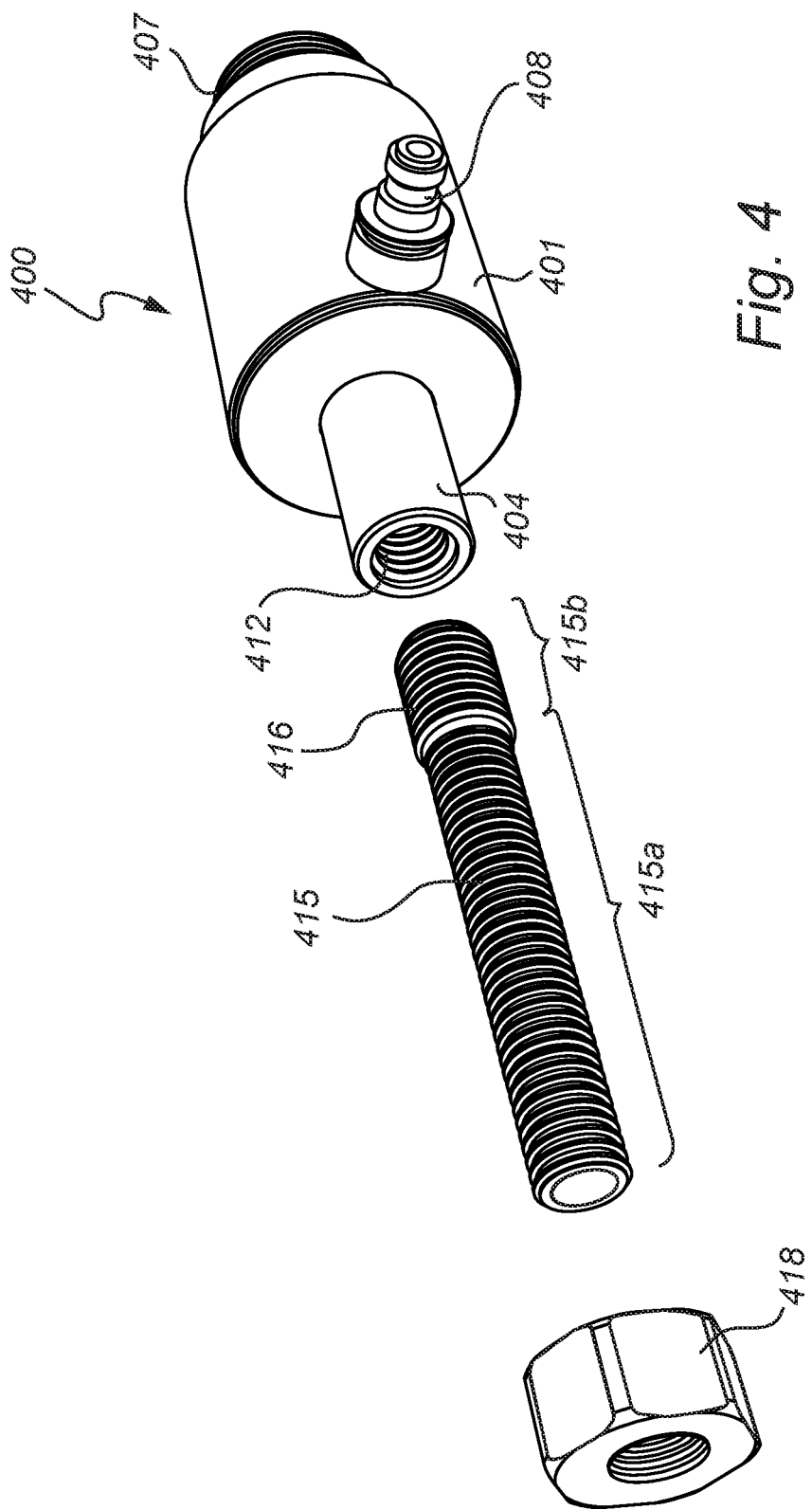
FIG. 4 is an exploded perspective view of the single acting hydraulic cylinder illustrated in FIG. 3.

Furthermore, there are outer threads provided along a substantial portion of the pulling rods 315 entire length, this is however in order to be able to secure items which are intended to be pulled, as will be further described in reference to FIG. 4. Moreover, the pulling rod 315 may comprise two portions (415a and 415b in FIG. 4), where the securing portion (415b in FIG. 4), i.e. the portion which may be arranged within the piston rod 204, can have a larger diameter than the rest of the pulling rod. This increases the rigidity/strength of the securing portion (415b in FIG. 4) in relation to the rest of the pulling rod 315 which is beneficial because in case of an unfortunate event (bending) as described above there is a larger probability that the pulling rod 315 will be bent at a weaker portion of its body. Thus, even further mitigating the risk of having a bent pulling rod 315 stuck inside the piston rod 304. Even though it is not shown in the exemplary embodiment illustrated in FIG. 3, the pulling rod 315 may comprise a tool engaging portion arranged at an end of the pulling rod 315, analogously to the tool engaging portion 214 arranged on the pressing rod 203 in FIGS. 2a and 2b. For most applications such as tool engaging portion is not needed on the pulling rod 215, since the adjustment of positions is predominantly made at a far end (viewed from the hydraulic cylinder 300) of the pulling rod by means of a threaded bolt (418 in FIG. 4). However, in some applications it is more convenient to move the complete pulling rod 315 in relation to the hydraulic cylinder 300/piston rod 304, which then can be done with a corresponding adjustment tool for the pulling rod 315 entering from the opposite side of the hydraulic cylinder 300.

FIG. 4 is an exploded perspective view of a hydraulic cylinder 400 in a pulling mode. Similarly to the previously discussed figures, the hydraulic cylinder 400 comprises a cylinder housing 401 having a hydraulic fluid port 408. The cylinder housing 401 also comprises an outer threading 407 around a portion located at a pressing end of the hydraulic cylinder 400. A part of the piston rod 404 can be seen extruding from the cylinder housing 401 at the pulling end of the hydraulic cylinder 400. The pulling rod 415 is then to be arranged within the piston rod 404, more precisely, within the pulling portion of the piston rod 404. The pulling portion of the piston rod 404 comprises an internally threaded section 412 which does not extend along the entire axial length of the piston rod 404, thereby preventing the pulling rod 415 to be screwed in long enough in the through hole of the piston rod 404 for it to extend along the entire axial length of the piston rod 404/hydraulic cylinder 400. As mentioned, this reduces the risk of having a pulling rod 415 being bent inside of the piston rod 404. The pulling rod comprises two portions 415a, 415b, where the shorter portion 415 is a securing portion comprising an outer screw threading 416 which is to engage the inner threading 412 of the pulling portion of the piston rod 404. The securing portion 415b can have a larger diameter than the second portion 415a of the pulling rod 415.

Further a threaded nut 418 may be provided with the hydraulic cylinder 400 when it is to be used in a pulling mode. The threaded nut 418 can be screwed onto the pulling rod 415 in order to secure an item that is to be pulled in towards the cylinder housing 401 of the hydraulic cylinder 400. For example, the threaded nut 418 may be used together with a pressing disk in order to secure a counter hold against a bearing seat when the hydraulic cylinder 400 is used for mounting a wheel bearing into the bearing seat.

The invention has mainly been described above with reference to a few embodiments. However, as is readily appreciated by a person skilled in the art, other embodiments than the ones disclosed above are equally possible within the scope of the invention, as defined by the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A single acting hydraulic cylinder having a pulling mode and a pressing mode, said single acting hydraulic cylinder comprising:
    a cylinder housing; and
    a piston rod arranged within the cylinder housing such that the piston rod can be actuated in response to a hydraulic pressure acting on said piston rod and wherein said piston rod comprises an axially extending through hole, wherein said piston rod further comprises a pulling portion having an internally threaded section partly extending into the axially extending through hole, in order to engage a threaded portion of a pulling rod,
    wherein the single acting hydraulic cylinder, in the pulling mode, further comprises the pulling rod having the threaded portion, and wherein the single acting hydraulic cylinder, in the pressing mode, further comprises a pressing rod having a threaded portion and wherein the piston rod comprises a pressing portion having an internally threaded section partly extending into the axially extending through hole, in order to engage the threaded portion of the pressing rod.

2. The single acting hydraulic cylinder according to claim 1, wherein said pressing portion is removable from the pulling portion of the piston rod.

3. The single acting hydraulic cylinder according to claim 1, wherein said pressing rod comprises two ends, wherein the end of said two ends which is arranged inside said through hole when said single acting hydraulic cylinder is being used in the pressing mode, comprises a tool engaging portion, thereby enabling adjustment of said pressing rod in relation to said piston rod.

4. The single acting hydraulic cylinder according to claim 3, wherein said tool engaging portion is a female tool engaging portion adapted to engage a corresponding male tool engaging portion.

5. The single acting hydraulic cylinder according to claim 1, wherein the piston rod further comprises means for limiting the depth of the pulling rod or pressing rod when screwed into the pulling portion or pressing portion respectively.

6. The single acting hydraulic cylinder according to claim 1, wherein the axial length of the single acting hydraulic cylinder is between 120 mm and 180 mm.

7. The single acting hydraulic cylinder according to claim 1, wherein the stroke length of the single acting hydraulic cylinder is between 40 mm and 60 mm.

8. The single acting hydraulic cylinder according to claim 1, wherein the pulling rod comprises two portions, where one of the two portions is a securing portion comprising an outer thread which is to engage the internally threaded section of the pulling portion, wherein said securing portion has a larger diameter than the other portion of the pulling rod.

9. A method for adjusting the position of a pressing rod in a single acting hydraulic cylinder, where the method comprises the steps of:
   providing a single acting hydraulic cylinder which comprises:
   a cylinder housing;
   a piston rod arranged within the cylinder housing such that the piston rod can be actuated in response to a hydraulic pressure acting on said piston rod and wherein said piston rod comprises an axially extending through hole, and wherein the piston rod further comprises a pressing portion having an internally threaded section partly extending into the axially extending through hole; and
   a pressing rod having a threaded portion which matches the internally threaded section of the pressing portion, said pressing rod being arranged within the pressing portion and wherein said pressing rod comprises two ends, wherein one of said two ends is arranged inside said axially extending through hole and comprises a first tool engaging portion;
   providing an adjustment tool having a second tool engaging portion;
   adjusting the position of the pressing rod relative to the pressing portion of said piston rod by engaging, via said axially extending through hole, said first tool engaging portion with said second tool engaging portion and rotating said adjustment tool around a longitudinal axis of the pressing rod.

10. A single acting hydraulic cylinder system having a pulling mode and a pressing mode, said single acting hydraulic cylinder system comprising:
   a cylinder housing;
   a piston rod arranged within the cylinder housing such that the piston rod can be actuated in response to a hydraulic pressure acting on said piston rod and wherein said piston rod comprises an axially extending through hole,
   a pulling rod having a threaded portion;
   a pressing rod having a threaded portion;
   wherein said piston rod further comprises a pulling portion having an internally threaded section partly extending into the axially extending through hole, in order to engage the threaded portion of the pulling rod; and
   wherein the piston rod comprises a pressing portion having an internally threaded section partly extending into the axially extending through hole, in order to engage the threaded portion of the pressing rod.

* * * * *